US012424777B2

United States Patent
Christensen et al.

(10) Patent No.: US 12,424,777 B2
(45) Date of Patent: Sep. 23, 2025

(54) METHOD FOR PRE-ASSEMBLY OF COMPRESSION ATTACHED MEMORY MODULES

(71) Applicant: DELL PRODUCTS L.P., Round Rock, TX (US)

(72) Inventors: Steven Michael Christensen, Austin, TX (US); Jonathan C. Giffen, Austin, TX (US)

(73) Assignee: Dell Products L.P., Round Rock, TX (US)

(*) Notice: Subject to any disclaimer, the term of this patent is extended or adjusted under 35 U.S.C. 154(b) by 463 days.

(21) Appl. No.: 17/868,091

(22) Filed: Jul. 19, 2022

(65) Prior Publication Data

US 2024/0030635 A1    Jan. 25, 2024

(51) Int. Cl.
*H01R 12/72* (2011.01)
*H01R 12/70* (2011.01)
*H01R 12/73* (2011.01)

(52) U.S. Cl.
CPC ....... *H01R 12/721* (2013.01); *H01R 12/7047* (2013.01); *H01R 12/737* (2013.01)

(58) Field of Classification Search
CPC .............. H01R 12/721; H01R 12/7047; H01R 12/737; H01R 12/777; H01R 12/712; H01R 12/7076; H01R 12/7052; H01R 12/7005; H01R 12/7011; H01R 12/7017; H01R 12/7029; H01R 12/70; H01R 12/72

See application file for complete search history.

(56) References Cited

U.S. PATENT DOCUMENTS

| | | | | |
|---|---|---|---|---|
| 7,729,122 B2* | 6/2010 | Wong | ................. | H01L 23/4093 |
| | | | | 361/709 |
| 7,870,888 B2* | 1/2011 | Zhou | ..................... | H01L 23/467 |
| | | | | 361/709 |
| 8,120,918 B2* | 2/2012 | Liu | ........................ | H01L 23/467 |
| | | | | 165/185 |
| 8,550,826 B2* | 10/2013 | Hsu | ...................... | H05K 7/1015 |
| | | | | 439/73 |
| 8,797,744 B2* | 8/2014 | Cawthon | ............ | H01L 23/4006 |
| | | | | 165/185 |
| 9,313,923 B2* | 4/2016 | Davis | .................. | H01L 23/4006 |
| 10,264,694 B1* | 4/2019 | Lin | ......................... | G06F 1/185 |
| 11,071,195 B1* | 7/2021 | Tong | .................... | H05K 1/0203 |

(Continued)

*Primary Examiner* — Harshad C Patel
(74) *Attorney, Agent, or Firm* — Larson Newman, LLP

(57) ABSTRACT

An apparatus is provided for mounting a compression attached memory module (CAMM) to a printed circuit board (PCB). The apparatus includes the CAMM, a fastener and a z-axis compression connector. The CAMM includes a mounting through-hole. The fastener includes a friction snap with a first diameter. The compression connector includes a profiled mounting through-hole. The profiled mounting through-hole has a narrowest portion having a second diameter that is less than the first diameter. When the fastener is inserted through the mounting through-hole and the profiled mounting through-hole, and when the friction snap comes into contact with the narrowest portion, the friction snap is pushed through the narrowest portion, and, after pushing the friction snap through the narrowest portion, the CAMM, the compression connector, and the fastener are aligned and retained as a unit.

20 Claims, 4 Drawing Sheets

(56) References Cited

U.S. PATENT DOCUMENTS

2010/0159738 A1\* 6/2010 Nolting .................... H01R 9/24
                                                                                                                          439/428
2022/0027078 A1   1/2022 Schnell et al.
2022/0029322 A1\* 1/2022 Schnell ................ H01R 12/592

\* cited by examiner

METHOD FOR PRE-ASSEMBLY OF COMPRESSION ATTACHED MEMORY MODULES

FIELD OF THE DISCLOSURE

This disclosure generally relates to information handling systems, and more particularly relates to a method for pre-assembly of compression attached memory modules (CAMMs) in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An apparatus may be provided for mounting a compression attached memory module (CAMM) to a printed circuit board (PCB). The apparatus may include the CAMM, a fastener and a z-axis compression connector. The CAMM may include a mounting through-hole. The fastener may include a friction snap with a first diameter. The compression connector may include a profiled mounting through-hole. The profiled mounting through-hole may have a narrowest portion having a second diameter that is less than the first diameter. When the fastener is inserted through the mounting through-hole and the profiled mounting through-hole, and when the friction snap comes into contact with the narrowest portion, the friction snap may be pushed through the narrowest portion, and, after pushing the friction snap through the narrowest portion, the CAMM, the compression connector, and the fastener may be aligned and retained as a unit.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
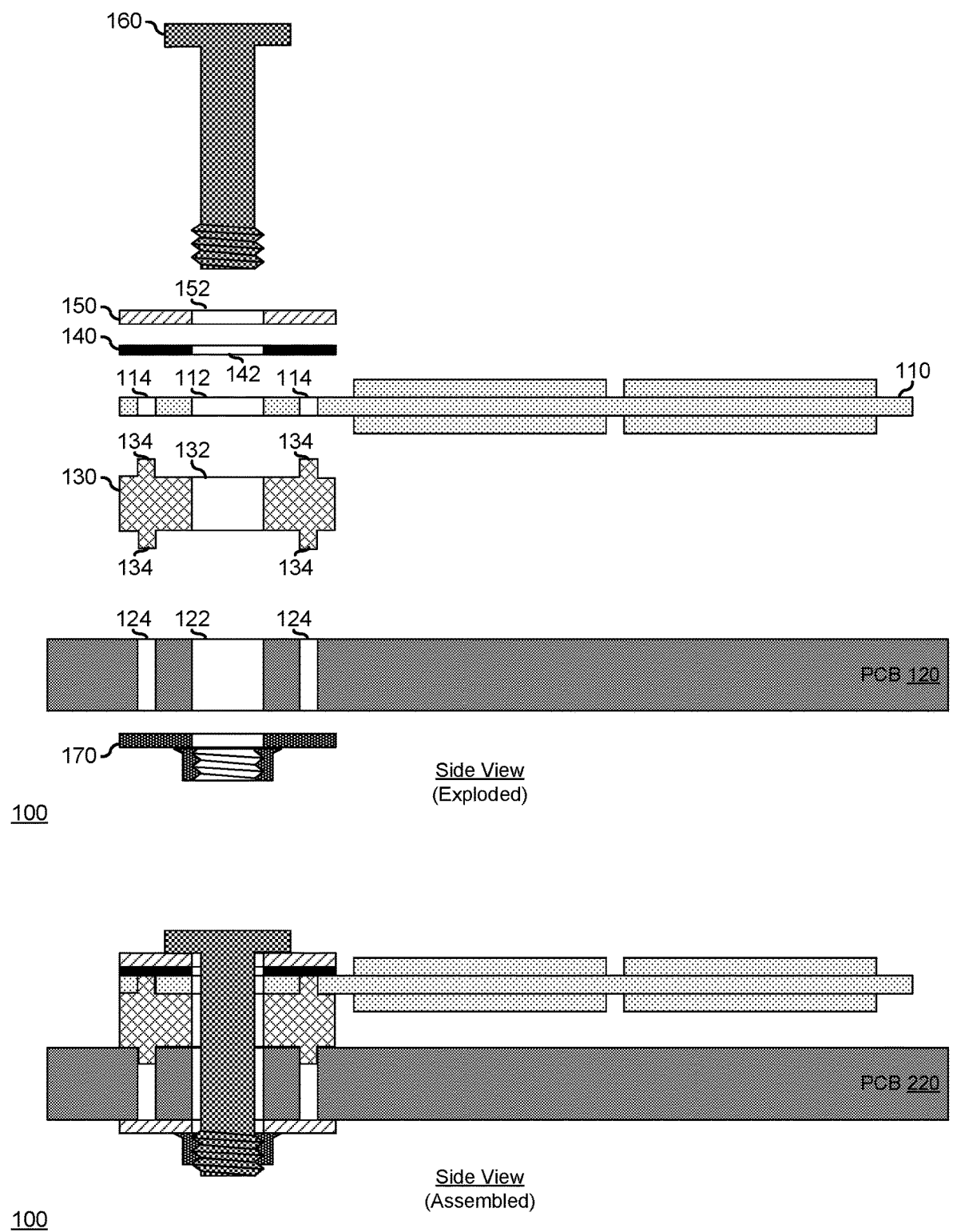
FIG. 1 illustrates a compression attached memory module (CAMM) stack-up as may be known in the prior art.

FIG. 1 illustrates a stack-up 100 for a compression attached memory module (CAMM) 110. In a top portion of FIG. 1, stack-up 100 is illustrated in an exploded side view. Stack-up 100 includes the CAMM 110, a printed circuit board (PCB) 120 to which the CAMM is to be mounted, a compression connector 130, an insulator 140, a mounting plate 150, a screw 160, and a backing plate 170. CAMM 110 includes a mounting through-hole 112 for mounting the CAMM to PCB 120, as described further below. CAMM 110 further includes alignment through-holes 114 for aligning the CAMM to PCB 120, as described further below. CAMM 110 represent a memory device for use in an information handling system. CAMM 110 will be understood to be provided in accordance with a particular double data rate (DDR) standard, such as a fourth generation DDR standard (DDR4), a fifth generation DDR standard (DDR5), or a sixth generation DDR standard (DDR6). The terms "Compression Attached Memory Module" and "CAMM" may be used interchangeably with analogous terms "Compression Dual In-Line Memory Module" and "cDIMM."

PCB 120 includes a mounting through-hole 122 for mounting CAMM 110 to the PCB, and alignment through-holes 124 for aligning the CAMM to the PCB, as described further below. PCB 120 represents a mainboard, a motherboard, a daughter card, or another type of printed circuit board that provides traces to electrically connect CAMM 110 to a processor or other computing device, as needed or desired. PCB 120 may include a configuration of traces that are provided in accordance with a common DDR standard with CAMM 110. The details of connecting a CAMM to a processor, and configuring a PCB to provide signal, data, power, and other traces to a CAMM, are known in the art, and will not be further described herein, except as may be needed to illustrate the current embodiments.

Compression connector 130 includes a mounting through-hole 132 for mounting CAMM 110 to PCB 120, and alignment tabs 134 on the top and bottom surface of the compression connector for aligning the CAMM to the PCB, as described further below. Compression connector 130 represents a z-axis, or "vertical," compression connector that provides a stand-off from PCB 120. Compression connector 130 includes separate metal contact elements on top and bottom surfaces of the compression connector, one for each signal line and power line provided by PCB 120 to CAMM 110. CAMM 110 includes surface contact connections that are compressed to engage with the contact elements. Examples of compression connectors may include cStack or mezzanine-type connectors from Amphenol, or the like.

Insulator 140 includes a mounting through-hole 142 for mounting CAMM 110 to PCB 120, as described further below. Mounting plate 150 includes a mounting through-hole 152 for mounting CAMM 110 to PCB 120, as described further below. CAMM 110 may include one or more circuit traces on a top side of the CAMM, and mounting place 150 may be fabricated of a metallic material. As such, insulator 140 provides an insulation layer between CAMM 110 and mounting plate 150 to prevent the shorting of any of the circuit traces by the mounting plate.

A bottom portion of FIG. 1 illustrates stack-up 100 in an assembled side view. CAMM 110 is aligned to compression connector 130 such that alignment tabs 132 on the top surface of compression connector 130 are inserted into alignment through-holes 114. The sub-assembly of CAMM 110 and compression connector 130 is aligned to PCB 120 such that alignment tabs 132 on the bottom surface of the compression connector are inserted into alignment through-holes 124. Insulator 140 is aligned with the top surface of CAMM 110, and mounting plate 150 is aligned with the top surface of the insulator. When CAMM 110, PCB 120, compression connector 130, insulator 140, and mounting plate 150 are properly aligned, mounting through-holes 112, 122, 132, 142, and 152 are likewise aligned to permit the insertion of screw 160 through the through-holes. Screw 160 and backing plate 170 each includes a threaded portion. An example of backing plate 170 may include a captive PEM nut or the like. Backing plate 170 is placed on a bottom side of PCB 120, screw 160 is inserted through the aligned mounting through-holes 112, 122, 132, 142, and 152, and the threaded portion of screw 160 is screwed into the threaded portion of the backing plate to secure CAMM 110 rigidly to the PCB. Screw 160 is tightened to ensure that sufficient compression is provided between CAMM 110 and compression connector 130, and between the compression connector and PCB 120 to ensure sound electrical connection between the PCB and the CAMM.

While stack-up 100 is illustrated as including a screw and backing plate, it will be understood that a CAMM and a compression connector may be fastened to a PCB by other through-hole fastening techniques, as needed or desired. For example, various broaching fasteners, captive fasteners, stand-off fasteners, surface mount fasteners, snaping fasteners, twist-lock fasteners, or the like, may be utilized in conjunction with the teachings of the current embodiments. Moreover, a CAMM and compression connector may be fastened to a PCB by two or more screws, as needed or desired.

While CAMM and compression connector memory topologies may permit higher signal speeds and reduced cost DIMMs and the associated soldered down connectors, such topologies present different problems. For example, instead of a single part (e.g., a DIMM) CAMM topologies necessitate multiple loose parts (such as a CAMM, a compression connector, an insulator, a mounting plate, a backing plate, screw, etc.). Further, the installation of CAMMs into an information handling system may be cumbersome due to the limited access available in a typical information handling system. For example, the screws can easily fall into the information handling system and get lost, or create a short which could damage the main board, or other system components. Further, the typical information handling system may include a large CPU cooler with sharp edges, voltage regulator heat sinks, disk drives, add-in-cards, ducting, cabling or other hardware in tight and poorly lit environments, making assembly even more challenging.

Figure 2:
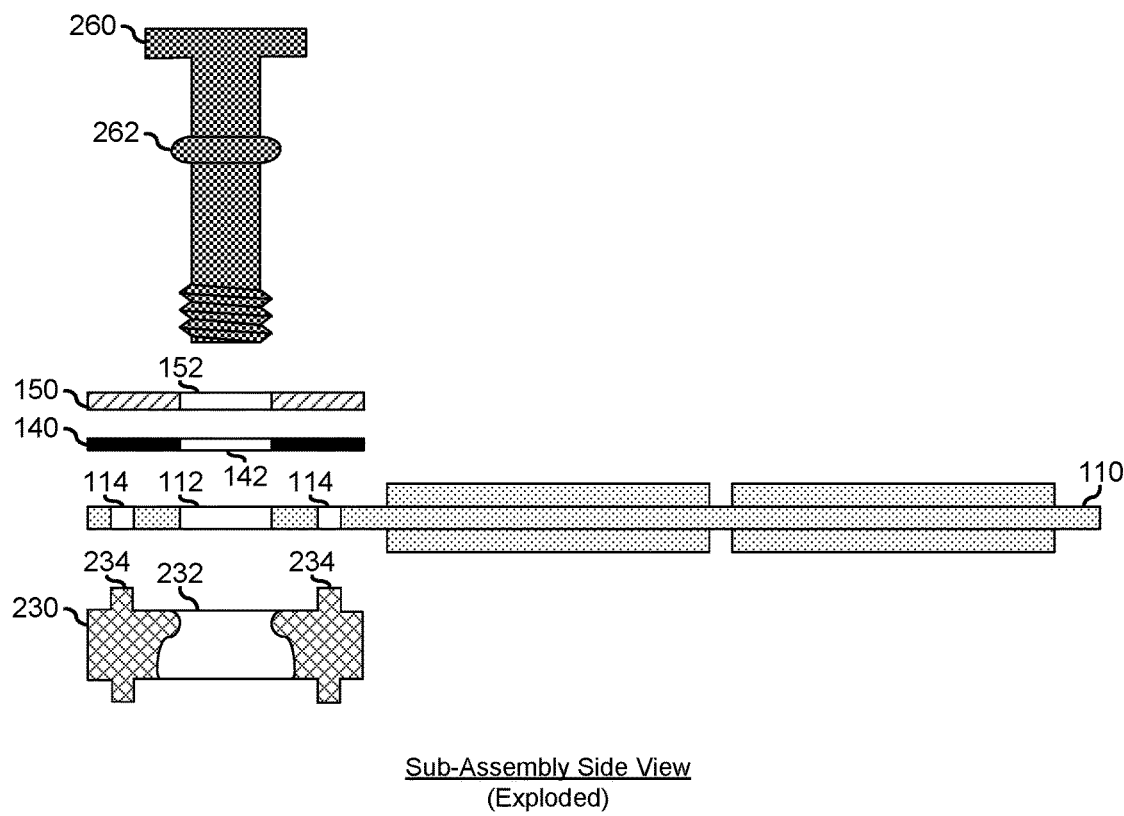
FIG. 2 illustrates a CAMM sub-assembly according to an embodiment of the present disclosure.
Figure 2:
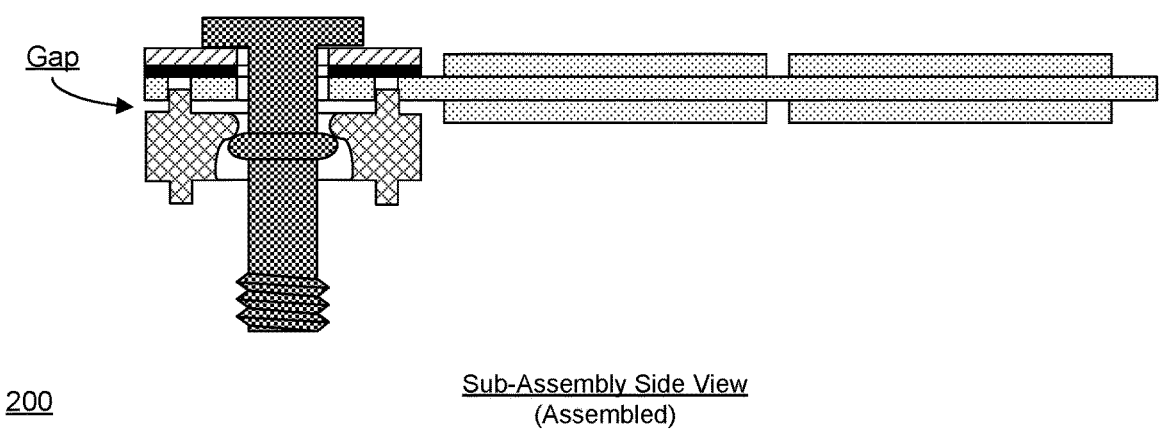

FIG. 2 illustrates a sub-assembly 200 for stack-up for a CAMM 110. In a top portion of FIG. 2, sub-assembly 200 is illustrated in an exploded side view. Sub-assembly 200 includes CAMM 110, insulator 140, mounting plate 150, a compression connector 230, and a screw 260. Sub-assembly 200 may be mounted to a PCB similar to PCB 120 with a backing plate similar to backing plate 170, as described above. Compression connector 230 is similar to compression connector 130, and includes a profiled mounting through-hole 232 similar to mounting through-hole 132, and alignment tabs 234 similar to mounting tabs 134. Screw 260 is similar to screw 160, and includes a friction snap 262, as described below.

A bottom portion of FIG. 2 illustrates sub-assembly 200 in a pre-assembled side view. CAMM 110 is aligned to compression connector 230 such that alignment tabs 232 on the top surface of compression connector 230 are partially inserted into alignment through-holes 114. Insulator 140 is aligned with the top surface of CAMM 110, and mounting plate 150 is aligned with the top surface of the insulator. When CAMM 110, compression connector 230, insulator 140, and mounting plate 150 are properly aligned, mounting through-holes 112, 232, 142, and 152 are likewise aligned to permit the insertion of screw 260 through the through-holes. A profile of profiled mounting through-hole 232 is sized to form a semi-tight friction interface with friction snap 262, as described below. For example, friction snap 262 may have a first diameter (D) and profiled mounting through-hole 232 may have a second diameter at its narrowest point (d), where D>d, but where the second diameter (d) is not so small as to completely prevent the insertion of screw 260 into profiled mounting through-hole 232. Screw 260 is inserted through the aligned mounting through-holes 112, 232, 142, and 152, until friction snap 262 engages with the profile of profiled mounting through-hole 232.

Additional pressure is applied to screw 260 to push friction snap 262 through profiled mounting through-hole 232, thereby holding CAMM 110, compression connector 230, insulator 140, and mounting plate 150 together. The fit between friction snap 262 and profiled mounting through-hole 232 should be sufficient to hold sub-assembly 200 together, but not so great as to prevent the disassembly of the subassembly. In particular, screw 260 should snap easily under hand pressure to hold sub-assembly 200 together. However, because CAMM 110 is the most expensive element of sub-assembly 200, it may be desirable for a user to mount the CAMM at a first time with a low-profile version of compression connector 230. However, at a later time, the user may desire to mount CAMM 110 using a high-profile version of compression connector 230. As such, the fit between friction snap 262 and profiled mounting through-hole 232 should not be so great as to prevent the user from disassembling sub-assembly 200 with the low-profile version of compression connector 230 by hand, and re-assembling a new sub-assembly with a high-profile version of the compression connector by hand. Note here that a screw provided in association with the low-profile version of a compression connector may be shorter than the screw provided in association with the high-profile version of the compression connector, as needed or desired. Note that, when fitted together, sub-assembly 200 may be fitted together sufficiently closely to engage alignment through-holes 114 with alignment tabs 234, but not so closely as to compress the compression contacts (not illustrated) of compression connector 230 by CAMM 110. As such, sub-assembly 200 is illustrated as having a gap between CAMM 110 and compression connector 230, and it will be understood that the pressure provided by screw 260 to fully compress the CAMM to the compression contacts of the compression connector will not typically be provided until sub-assembly 200 is assembled to a PCB, as described below. Note further that sub-assembly 200 can be assembled at any time prior to assembly into an information handling system, and particularly can be assembled by a manufacturer of CAMM 110, such that the sub-assembly is purchased as, and inventoried as a single line item, permitting easier inventory management of the sub-assembly, as needed or desired.

When sub-assembly 200 is to be assembled into an information handling system, a bottom portion of screw 260 is inserted into a mounting through-hole of a PCB of the information handling system, and the sub-assembly is aligned to a PCB such that alignment tabs on the bottom surface of compression connector 230 are inserted into alignment through-holes in the PCB. A backing plate similar to backing plate 170 is placed on a bottom side of the PCB, and the threaded portion of screw 260 is screwed into a threaded portion of the backing plate to secure CAMM 110 rigidly to the PCB. Screw 260 is tightened to ensure that sufficient compression is provided between CAMM 110 and compression connector 230, and between the compression connector and the PCB to ensure sound electrical connection between the PCB and the CAMM.

Further levels of pre-assembly may be utilized as needed or desired. In a particular embodiment, insulator 140 is provided with a layer of pressure sensitive adhesive on the top and bottom surfaces of the insulator. CAMM 110 is adhered to the bottom surface of insulator 140 and mounting plate 150 is adhered to the top surface of the insulator. In this way, CAMM 110, insulator 140, and mounting plate 150 are provided as a separate pre-assembly. Then sub-assembly 200 is formed when the pre-assembly is aligned to compression connector 230, and screw 260 is inserted into mounting through-holes 112, 232, 142, and 152 as described above. The pre-assembly can be assembled by a manufacturer of CAMM 110, such that the pre-assembly is purchased as, and inventoried as a single line item, permitting easier inventory management of the pre-assembly, as needed or desired.

In another embodiment, CAMM 110 and compression connector 230 are pre-assembled together. Alignment tabs 234 on the top surface of compression connector 230 and alignment through-holes 114 are arranged to provide a friction fit between the CAMM and the compression connector. For example, alignment tabs 234 on the top surface of compression connector 230 may have a first diameter (T), and alignment through-holes 114 may have a second diameter (t), where T>t, but where the second diameter (d) is not so small as to completely prevent the pre-assembly of CAMM 110 and compression connector 230.

Figure 3:
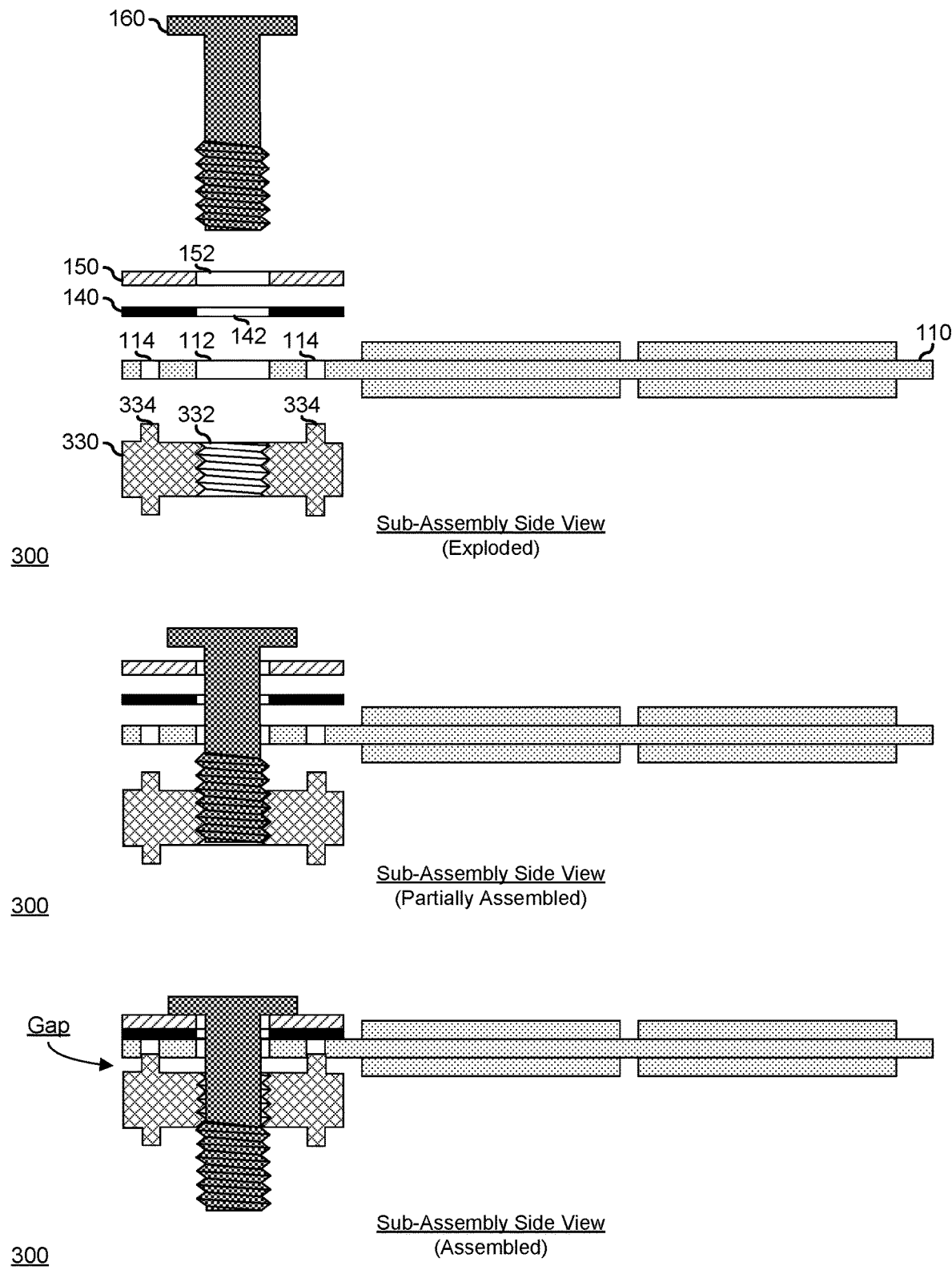
FIG. 3 illustrates a CAMM sub-assembly according to another embodiment of the present disclosure.

FIG. 3 illustrates a sub-assembly 300 for stack-up for a CAMM 110. In a top portion of FIG. 3, sub-assembly 300 is illustrated in an exploded side view. Sub-assembly 300 includes CAMM 110, insulator 140, mounting plate 150, screw 160, and a compression connector 330. Sub-assembly 300 may be mounted to a PCB similar to PCB 120 with a backing plate similar to backing plate 170, as described above. Compression connector 330 is similar to compression connector 130, and includes a threaded mounting through-hole 332, and alignment tabs 334 similar to mounting tabs 134.

A middle portion of FIG. 3 illustrates sub-assembly 300 in a partially-assembled side view. CAMM 110 is aligned to compression connector 330 such that alignment tabs 332 on the top surface of compression connector 330 are inserted into alignment through-holes 114. Insulator 140 is aligned with the top surface of CAMM 110, and mounting plate 150 is aligned with the top surface of the insulator. When CAMM 110, compression connector 330, insulator 140, and mounting plate 150 are properly aligned, mounting through-holes 112, 332, 142, and 152 are likewise aligned to permit the insertion of screw 160 through the through-holes and the screw is partially screwed into threaded mounting through-hole 332. Threaded mounting through-hole 332 has a thread pitch that matches the thread pitch of the threaded portion of screw 160. In this partially-assembled state, screw 160 is inserted through the aligned mounting through-holes 112, 142, and 152, and screwed into threaded mounting through-hole 332, but is not screwed completely through the threaded mounting through-hole, permitting room to align the components prior to completing the sub-assembly 300, as described below.

A bottom portion of FIG. 3 illustrates sub-assembly 300 in a pre-assembled side view. CAMM 110 is aligned to compression connector 330 such that alignment tabs 332 on the top surface of compression connector 230 are partially inserted into alignment through-holes 114. Insulator 140 is aligned with the top surface of CAMM 110, and mounting plate 150 is aligned with the top surface of the insulator. When CAMM 110, compression connector 330, insulator 140, and mounting plate 150 are properly aligned, screw 160 is screwed the rest of the way through threaded mounting through-hole 332. Screw 160 and the threaded portion of the screw are dimensioned such that, when screwed completely through threaded mounting through-hole 332, sub-assembly 300 is fitted together sufficiently closely to engage alignment through-holes 114 with alignment tabs 334, but not so closely as to compress the compression contacts (not illustrated) of compression connector 330 by CAMM 110. As such, sub-assembly 300 is illustrated as having a gap between CAMM 110 and compression connector 330, and it will be understood that the pressure provided by screw 160 to fully compress the CAMM to the compression contacts of the compression connector will not typically be provided until sub-assembly 300 is assembled to a PCB, as described below. Note further that sub-assembly 300 can be assembled at any time prior to assembly into an information handling system, and particularly can be assembled by a manufacturer of CAMM 110, such that the sub-assembly is purchased as, and inventoried as a single line item, permitting easier inventory management of the sub-assembly, as needed or desired.

As with sub-assembly 200 described above, sub-assembly 300 is fitted together in such a way as to be easily disassembled by a user of the sub-assembly. For example, it may be desirable for a user to mount CAMM 100 at a first time with a low-profile version of compression connector 330, and to mount the CAMM at a later time using a high-profile version of the compression connector. Here, disassembly and reassembly is as simple as unscrewing screw 160 completely from the low-profile version of compression connector 330, and reassembling as described above with a high-profile version of the compression connector. Note here that a screw provided in association with the low-profile version of a compression connector may be shorter than the screw provided in association with the high-profile version of the compression connector, as needed or desired.

When sub-assembly 300 is to be assembled into an information handling system, the sub-assembly is aligned to a PCB of the information handling system such that alignment tabs on the bottom surface of compression connector 330 are inserted into alignment through-holes in the PCB. A backing plate similar to backing plate 170 is placed on a bottom side of the PCB, and screw 160 is inserted through a mounting through-hole in the PCB, and screwed into a threaded portion of the backing plate to secure CAMM 110 rigidly to the PCB. Screw 160 is tightened to ensure that sufficient compression is provided between CAMM 110 and compression connector 330, and between the compression connector and the PCB to ensure sound electrical connection between the PCB and the CAMM. Further levels of pre-assembly may be utilized as described above with regard to sub-assembly 200.

Figure 4:
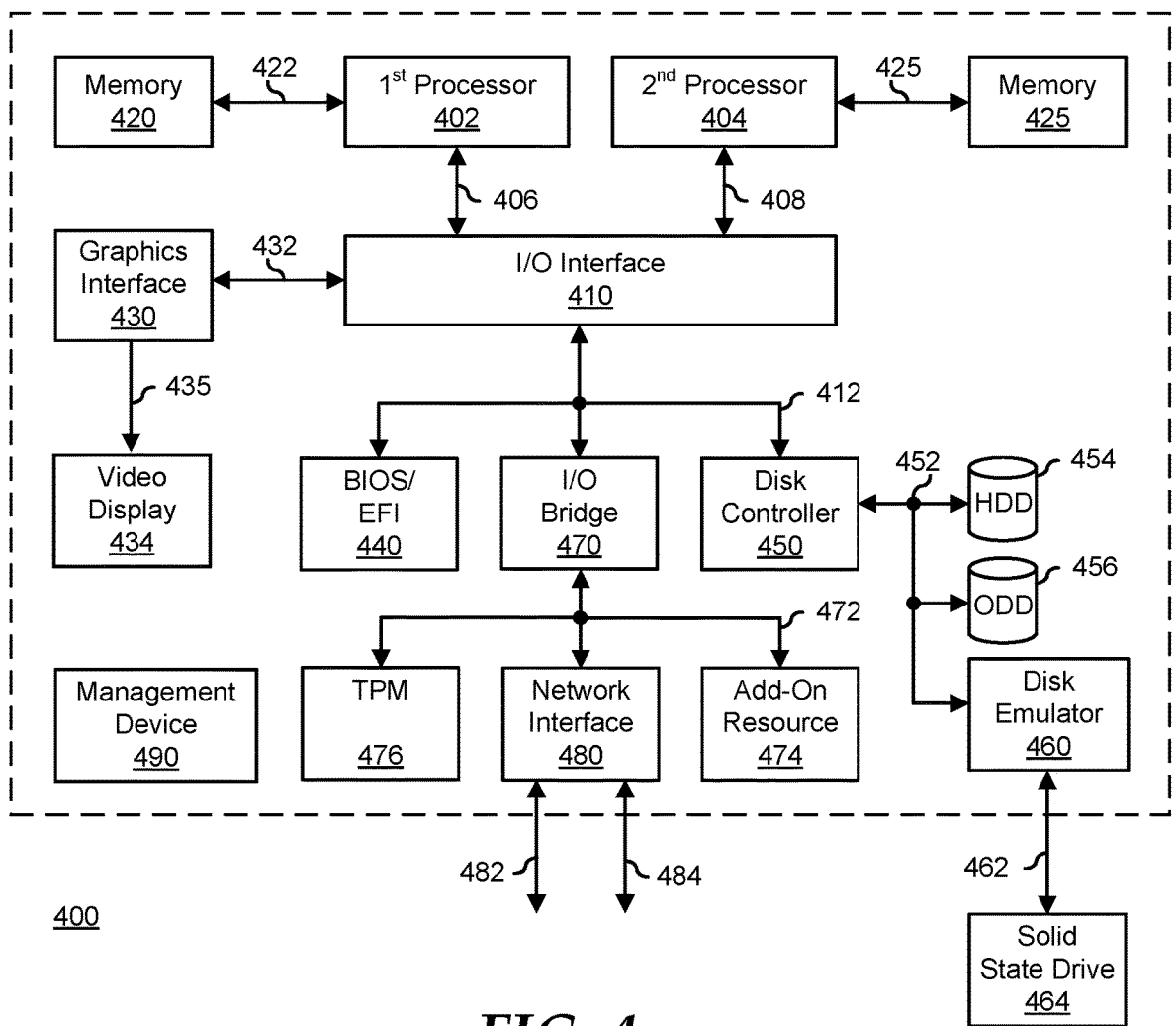
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system.

The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for mounting a compression attached memory module (CAMM) including at least one first mounting through-hole to a printed circuit board (PCB), the apparatus comprising:
    a first fastener configured to secure the CAMM to the PCB, the first fastener having a first friction snap with a first diameter; and
    a z-axis compression connector including at least one first profiled mounting through-hole, wherein the first profiled mounting through-hole has a first narrowest portion, the first narrowest portion with a second diameter that is less than the first diameter such that, when the first fastener is inserted through the first mounting through-hole and the first profiled mounting through-hole, and when the first friction snap comes into contact with the first narrowest portion, the first friction snap is pushed through the first narrowest portion, wherein after pushing the first friction snap through the first narrowest portion, the CAMM, the compression connector, and the first fastener are retained and aligned as a unit.

2. The apparatus of claim 1, further comprising a mounting plate including at least one second mounting through-hole through the mounting plate, wherein the first fastener is further inserted through the second through-hole, and wherein the mounting plate is included in the unit.

3. The apparatus of claim 2, further comprising an insulator including at least one third mounting through-hole through the mounting plate, wherein the first fastener is further inserted through the third through-hole, wherein the insulator is situated between the CAMM and the mounting plate, and wherein the insulator is included in the unit.

4. The apparatus of claim 3, further comprising a first adhesive layer affixed to a first side of the insulator, to adhere the insulator to the CAMM.

5. The apparatus of claim 4, further comprising a second adhesive layer affixed to a second side of the insulator, to adhere the insulator to the mounting plate.

6. The apparatus of claim 1, wherein the CAMM further includes at least one alignment hole, and the compression connector includes at least one first alignment tab, the alignment hole and the first alignment tab being configured to ensure an alignment of the CAMM to the compression connector.

7. The apparatus of claim 6, wherein the alignment hole has a first dimension and the alignment tab has a second dimension that is greater than the first dimension, such that, when the alignment tab is inserted into the alignment hole the compression connector is retained to the CAMM by friction between the alignment hole and the alignment tab.

8. The apparatus of claim 6, wherein the compression connector includes at least one second alignment tab, the second alignment tab being configured to ensure the alignment of the compression connector to the PCB.

9. An apparatus for mounting a compression attached memory module (CAMM) including at least one first mounting through-hole to a printed circuit board (PCB), the apparatus comprising:
   a first fastener configured to secure the CAMM to the PCB, the first fastener having a first friction snap with a first diameter;
   a z-axis compression connector including at least one first profiled mounting through-hole, wherein the first profiled mounting through-hole has a first narrowest portion, the first narrowest portion with a second diameter that is less than the first diameter such that, when the first fastener is inserted through the first mounting through-hole and the first profiled mounting through-hole, and when the first friction snap comes into contact with the first narrowest portion, the first friction snap is pushed through the first narrowest portion, wherein after pushing the first friction snap through the first narrowest portion, the CAMM, the compression connector, and the first fastener are retained and aligned as a unit; and
   a mounting plate including at least one second mounting through-hole through the mounting plate, wherein the first fastener is further inserted through the second through-hole, and wherein the mounting plate is included in the unit;
   wherein the CAMM further includes at least one alignment hole, and the compression connector includes at least one first alignment tab, the alignment hole and the first alignment tab being configured to ensure an alignment of the CAMM to the compression connector.

10. The apparatus of claim 9, further comprising an insulator including at least one third mounting through-hole through the mounting plate, wherein the first fastener is further inserted through the third through-hole, wherein the insulator is situated between the CAMM and the mounting plate, and wherein the insulator is included in the unit.

11. The apparatus of claim 10, further comprising a first adhesive layer affixed to a first side of the insulator, to adhere the insulator to the CAMM.

12. The apparatus of claim 11, further comprising a second adhesive layer affixed to a second side of the insulator, to adhere the insulator to the mounting plate.

13. The apparatus of claim 9, wherein the alignment hole has a first dimension and the alignment tab has a second dimension that is greater than the first dimension, such that, when the alignment tab is inserted into the alignment hole the compression connector is retained to the CAMM by friction between the alignment hole and the alignment tab.

14. The apparatus of claim 9, wherein the compression connector includes at least one second alignment tab, the second alignment tab being configured to ensure the alignment of the compression connector to the PCB.

15. A method, comprising:
   providing, on a compression attached memory module (CAMM), at least one first mounting through-hole;
   providing, on a z-axis compression connector, at least one first profiled mounting through-hole; and
   inserting a first fastener through the first mounting through-hole and the first profiled mounting through-hole, the first fastener having a first friction snap with a first diameter;
   wherein the first profiled mounting through-hole has a first narrowest portion, the first narrowest portion with a second diameter that is less than the first diameter such that, when the first fastener is inserted through the first mounting through-hole and the first profiled mounting through-hole, and when the first friction snap comes into contact with the first narrowest portion, the first friction snap is pushed through the first narrowest portion, wherein after pushing the first friction snap through the first narrowest portion, the CAMM, the compression connector, and the first fastener are retained and aligned as a unit.

16. The method of claim 15, further comprising;
   providing, on a mounting plate, at least one second mounting through-hole; and
   inserting the first fastener is further inserted through the second through-hole, wherein the mounting plate is included in the unit.

17. The method of claim 16, further comprising;
   providing, on an insulator, at least one third mounting through-hole; and
   inserting the first fastener through the third through-hole, wherein the insulator is situated between the CAMM and the mounting plate, and wherein the insulator is included in the unit.

18. The method of claim 17, further comprising;
   affixing a first adhesive layer affixed to a first side of the insulator, to adhere the insulator to the CAMM.

19. The method of claim 18, further comprising;
   affixing a second adhesive layer to a second side of the insulator, to adhere the insulator to the mounting plate.

20. The method of claim 15, wherein the CAMM further includes at least one alignment hole, and the compression connector includes at least one first alignment tab, the alignment hole and the first alignment tab being configured to ensure an alignment of the CAMM to the compression connector.

* * * * *